United States Patent [19]

Hayashi et al.

[11] Patent Number: 4,766,326
[45] Date of Patent: Aug. 23, 1988

[54] COMMUNICATION STRUCTURE IN A STEERING WHEEL

[75] Inventors: Chikahisa Hayashi; Makoto Kawai; Yoshikazu Hirose; Junichi Mizutani, all of Aichi, Japan

[73] Assignee: Toyoda Gosei Co., Ltd., Nishikasugai, Japan

[21] Appl. No.: 887,622

[22] Filed: Jul. 21, 1986

[30] Foreign Application Priority Data

Jul. 20, 1985 [JP] Japan ................................ 60-160650

[51] Int. Cl.⁴ ............................................. H02G 3/00
[52] U.S. Cl. ..................................... 307/10 R; 307/9; 307/10 AT; 200/61.54; 340/55
[58] Field of Search ................. 307/10 R, 9, 10 AT; 364/424; 180/78; 74/484 R, 552, 802; 200/5 B, 56 R, 61.27, 61.35, 61.54, 61.55, 61.56, 61.57; 116/31; 340/52 F, 52 R, 53, 55, 56, 64, 825.69, 825.72; 455/602, 613

[56] References Cited

U.S. PATENT DOCUMENTS

| | | | |
|---|---|---|---|
| 4,421,960 | 12/1983 | Arima et al. | 200/61.54 |
| 4,438,425 | 3/1984 | Tsuchida et al. | 340/55 |
| 4,456,903 | 6/1984 | Kishi et al. | 180/78 X |
| 4,471,230 | 9/1984 | Yamamoto | 307/115 X |
| 4,485,371 | 11/1984 | Yamada et al. | 200/61.54 X |
| 4,514,645 | 4/1985 | Endo et al. | 307/10 R |
| 4,561,324 | 12/1985 | Hiramitsu et al. | 74/802 X |
| 4,572,313 | 2/1986 | Ono et al. | 180/78 |
| 4,598,603 | 7/1986 | Hiramitsu et al. | 74/484 R |
| 4,604,912 | 8/1986 | Sugita et al. | 200/61.54 X |
| 4,609,904 | 9/1986 | Paine | 200/61.54 X |
| 4,616,224 | 10/1986 | Reighard | 307/10 R X |
| 4,635,029 | 1/1987 | Yamada | 307/10 R X |

FOREIGN PATENT DOCUMENTS

| | | | |
|---|---|---|---|
| 0183580 | 6/1986 | European Pat. Off. | 307/10 R |
| 0095232 | 6/1982 | Japan | 200/61.54 |
| 0198141 | 12/1982 | Japan | 200/61.54 |
| 58-33548 | 2/1983 | Japan . | |

Primary Examiner—William M. Shoop, Jr.
Assistant Examiner—Paul Ip
Attorney, Agent, or Firm—Cushman, Darby & Cushman

[57] ABSTRACT

A communication structure provided in a steering wheel. The steering wheel includes having a steering shaft; a boss fixed to it. At least one spoke fixed to the boss. A pad is installed relatively rotatably to the steering shaft at a position more proximate to the driver than the boss. A column is positioned in relation to the pad so that at least one of the spoke and a boss plate is sandwiched therebetween. At least one set of magnetic communication units composed of a receiving unit and a transmitting unit is provided on the pad and said column, at least one of which consists of a core and a coil wound thereon.

18 Claims, 7 Drawing Sheets

COMMUNICATION STRUCTURE IN A STEERING WHEEL

BACKGROUND OF THE INVENTION

1. Field of the Invention

The present invention relates to a steering wheel the pad of which is non-rotatable, and more particularly, to a communication structure in which to utilize magnetism between a column and a pad.

2. Description of the Related Art

As for this kind of steering wheel, it is now known that a pad provided at the hub of a steering wheel may be equipped with electronic appliances such as a switch, a sounding device, a display device and so on which are closely associated with a klaxon, a constant speed traveling device, a transmitter, a radio, a head light or the like by making the most of the unrotatable pad.

Where such electronic appliances are installed, it is required to transmit and receive a signal between the pad and the column. As a transmitting-and-receiving means, there have been proposed a slip ring method and light beam-using method for providing the necessary pad to column communication.

The above-described methods are, however, attended with some problems which are described as follows:

Namely, in case of employing the slip ring method, inasmuch as the the number of transmittible and receivable signals is in proportion to the number of the slip rings, much information could not be transferred on account of constraints such as a size of the slip rings and the number thereof or the like.

Furthermore, the slip ring method creates defects wherein there is a possibility to cause a signal error which is referable to contact resistance produced when the slip ring comes into contact with a brush, this being deemed troublesome in performing multiplex transmission and receiving.

In addition, a light communication system involves such an arrangement that spokes are inevitably disposed between a transmitter and a receiver and hence it is necessary to take some measures toward this shielding member.

What is more, a distingushing circuit needs to be provided for the purpose of distingushing disturbance light such as solar light or the like from a light signal; and there are required light-shielding members for shielding light communication portions from the light, this unfavorably leading to an increase in number of components and further to intricacy in fabricating process.

SUMMARY OF THE INVENTION

Accordingly, it is a primary object of the present invention to provide a steering wheel having a communication structure wherein it is feasible to miniaturize transmitting and receiving units themselves, to reduce consumption of electric power, and further to miniaturize and simplify a magnetic circuit itself, whereby the production thereof is possible at relatively low costs.

To this end, according to one aspect of the invention, there is provided a steering wheel that is possessed of a communication structure wherein an intensified magnetic field is generated from a transmitting unit, and a magnetic communication channel is rendered large in width.

According to another aspect of the invention, there is provided a steering wheel that is possessed of a communication structure wherein spokes are disposed on the magnetic communication channel, even if an inverse magnetic flux is produced because of the fact that an eddy current is created at the spokes, the magnetic communication channel is not completely blockaded, and no matter what position the spokes may be at, the magnetic communication can be effected.

According to still another aspect of the invention, there is provided a steering wheel having a communication structure wherein it is feasible to increase the volume of lines of magnetic forces which are to be taken in and to securely transfer a signal by enhancing the sensitivity of the magnetic communication.

To accomplish the above-described objects of the present invention, the communication structure in a steering wheel essentially composed of: a steering shaft; a boss fixed to said steering shaft; at least one spoke fixed to said boss; a pad installed relatively rotatably to said steering shaft at a position more proximate to a driver than said boss; a column standing in such relation to said pad that at least one of said spoke and a boss plate is sandwiched therebetween; and at least one set of magnetic communication units composed of a receiving unit and a transmitting unit provided on said pad and said column, at least one of which consists of a core and a coil wound thereon.

Other and further objects of the present invention will beocme apparent upon an understanding of the illustrative embodiments which will hereinafter be described or will be manifested in the appended claims, and various advantages that are not referred to herein will occur to those skilled in the art upon employment of the invention in practice.

DETAILED DESCRIPTION OF THE PREFERRED EMBODIMENTS

Figure 1:
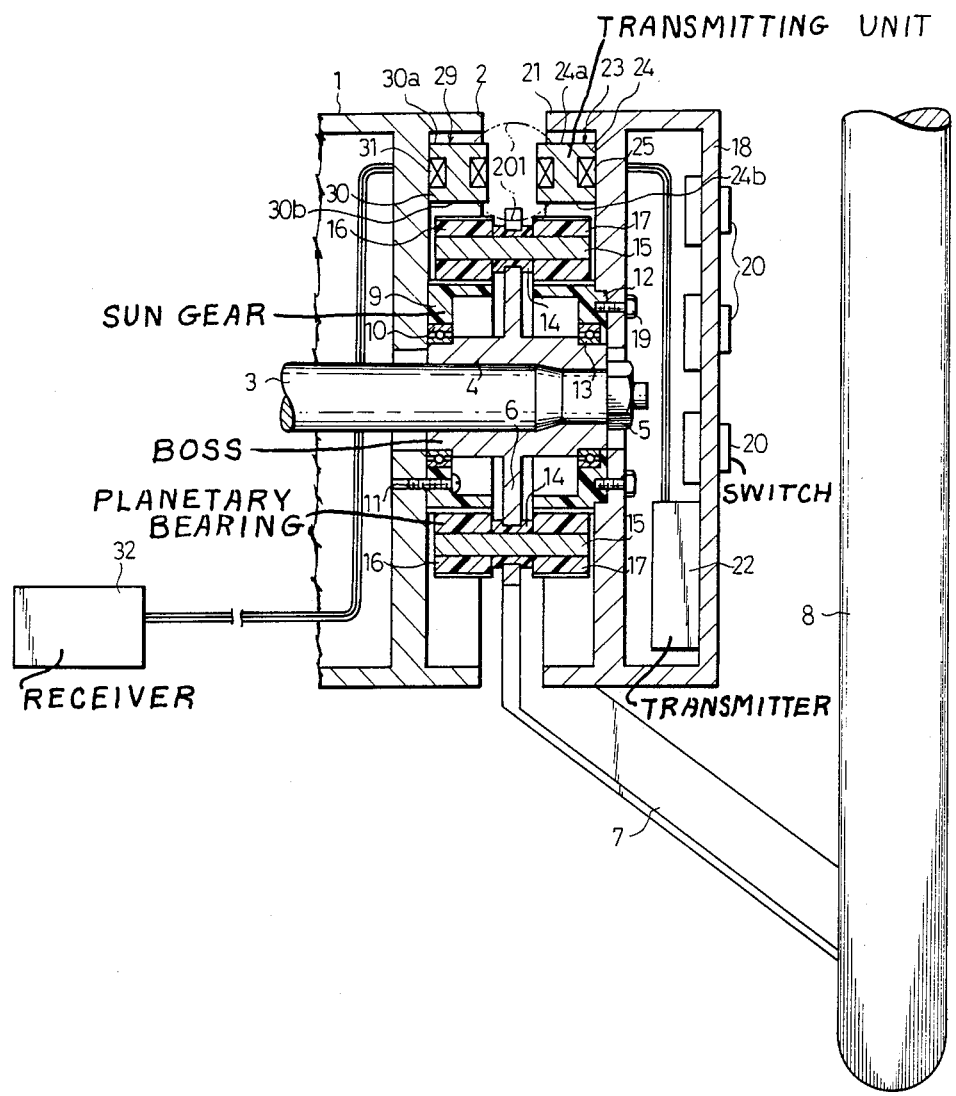
FIG. 1 is a fragmentary sectional view showing of one embodiment of a steering wheel according to the present invention.

There will be described one embodiment in which a communication means (hereinafter be referred to as magnetic communication) that employs magnetism according to the present invention is shown in relation to a steering wheel designed for automobiles with reference to FIGS. 1 to 9 inclusive.

The other periphery of the front end of a steering column 1 of a motorcar is provided with a photrudent member 2 for preventing the permeation of dust and light. A steering shaft 3 penetrates the column 1. A boss 4 is clamped by a nut 5 to be fixed to the front end of the steering shaft 3, to which boss 4 is fixed a boss plate 6 by welding or by other methods.

The outer periphery of the lower portion of the boss plate 6 includes two spokes 7 which are integrally fixed thereto by welding or by other similar methods, these spokes extending from the boss plate extend at a substantially right-angled configuration in relation thereto. A ring 8 is supportingly fixed to each of the tip ends of the spokes 7.

A sun gear 9 composed of synthetic resin is placed on the side of the column and so mounted on the outer periphery of the boss 4 as to be relatively rotatable with respect to the same boss 4 which is disposed on the side of the column at the rear of the boss plate 6 via a bearing 10. The sun gear 9 is so fixed by a bolt 11 as to be fixed, i.e. non-rotatable with respect to the column 1. Similarly, a sun gear 12 composed of the synthetic resin is placed on the side of the pad and so mounted on the outer periphery of the boss 4 as to be relatively rotatable with respect to the boss 4 which is disposed on the side of the pad at the front of the boss plate 6 via a bearing 13. These sun gears 9, 12 are formed so that the two gears are the same in diameter as well as in gear ratio.

A pair of bearings 14 made of synthetic resin such as polyacetal or the like are respectively installed on the positions which stand at an angle of 180° in the peripheral direction with respect to the outer periphery of the boss plate 6. Each of the bearings 14 is rotatably equipped with a planetary shaft 15. Planetary gears 16, 17 that are respectively disposed on the sides of the pad and the column are fastened at both ends of each of the planetary shafts 15, which ends are directed toward the column and the pad, respectively. The planetary bearings 16, 17, composed of synthetic resin, are the same in diameter as well as in gear ratio and respectively engage with the sun gears 9, 12 disposed on the sides of the pad and the column. Therefore, the planetary gears 16, 17 disposed on the sides of the pad and the column are so arranged as to revolve while simultaneously and similarly turning round the sun gears 9, 12.

A box-like pad 18 is secured by a bolt 19 on the front end surface of the sun gear 12 disposed on the side of the pad; and on the front surface of the pad 18 are installed electronic appliances such as a switch 20, a sounding device, a display device (not illustrated), or the like, relative to a klaxon, a constant speed traveling device, a transmitter, a radio, a head light control, and so on.

A protrudent member 21 for preventing the permeation of dust and light is so provided at the outer edge of the rear end of the pad 18 as to project therefrom, this protrudent member 21 being spaced a small distance from the protrudent member 2.

The inside of the pad 18 is equipped a transmitter 22 to be linked to the electronic appliances like the switch 20 and so on. The transmitter 22 effects pulse modulation of an electric current signal whose length corresponds to the type of the electronic appliance with the aid of a microcomputer that is not illustrated herein; and further, this transmitter 22 transmits the electric current signal to a transmitting unit 23 in order to drive it.

At the upper portion of the rear surface of the pad 18. A transmitting unit 23 designed for magnetic communication is disposed outside the outer periphery of the boss plate 6, viz., at a position immediately in front of a rotational locus of the spokes 7. In this embodiment, the transmitting unit 23 consists of a ferrite I-shaped core 24 and a coil 25, the core 24 being provided with flanges 24a, 24b at both ends thereof, the diameters of which are rendered large, and the coil being wound between the aforementioned flanges 24a, and 24b. The transmitting unit 23 is linked to the above-described transmitter 22 to generate a magnetic field (hereinafter be referred to as a magnetic signal).

Hence, the transmitting unit 23 converts the signal sent from the transmitter 22 and transmits the magnetic signal to the column 1.

Figure 4:
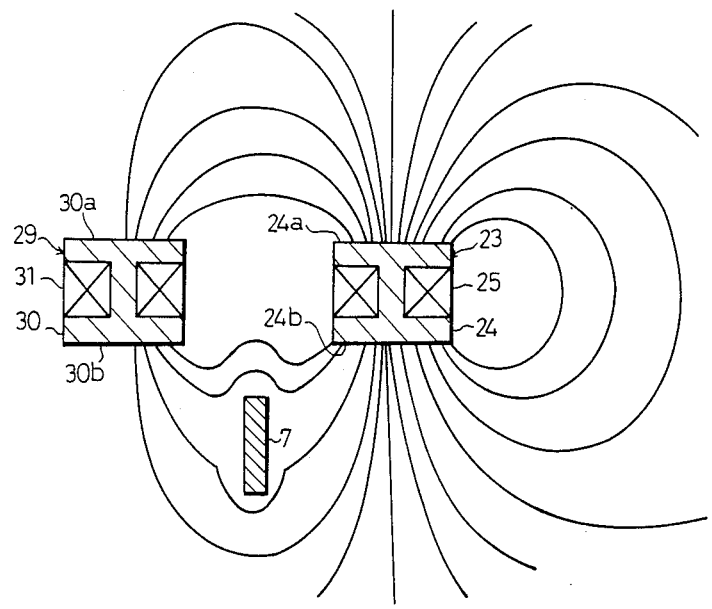
FIG. 4 is a partially sectional schematic diagram showing a condition of magnetic communication when the steering wheel is disposed in the state depicted in FIG. 3.

On the other hand, a receiving unit 29 is provided in front of the transmitting unit 23, so that the rotational locus of the spokes 7 is interposed therebetween, viz., at the upper portion of the end surface of the column 1, so that the magnetic signal transmitted from the transmitting unit 23 reaches the receiving unit. According to this embodiment, the receiving unit 29 has the same construction as that of the aforementioned transmitting unit 23. To be specific, the receiving unit 29 consists of a ferrite I-shaped core 30 and a coil 31, the core 30 subsuming flanges 30a, 30b at the both ends thereof the diameters of which are rendered large, the coil 31 being wound between the flanges 30a, 30b. The receiving unit 29 is connected to a receiver 32 provided at the rear of the column 1. The receiver 32 is arranged to reproduce the electric current signal which is generally identical with the signal sent out from the transmitting unit 23 in accordance with electromotive forces induced by the receiving unit 29 in response to the magnetic signal from the transmitting unit 23. When the spokes 7 are positioned between the transmitting unit 23 and the receiving unit 29, the coils 25, 31 of the transmitting and receiving units 23, 29 are disposed so that the respective directions of axial cores thereof are in parallel with the widthwise directions of the spokes 7. More specifically, when drawing a circle which passes through the transmitting and receiving units 23, 29 around the axial core of a steering shaft 3, which core is defined as the center for the circle, the direction of a tangent to the circle at the places where the transmitting and receiving units 23, 29 are positioned is in parallel with each of the directions of the axial cores of the coils 25, 31 of the transmitting and receiving units 23, 29. Such being the case, lines of magnetic forces caused by the cores 24, 30, as shown in FIG. 4, form a magnetic field extending in the widthwise directions of the spokes 7.

Consequently, a magnetic communication channel 201 on which the magnetic signal is transferred has a large width and is formed astride the spokes 7. This channel 201 is provided between a set of the flanges 24a, 24b of the transmitting unit 23 which is disposed so that the rotational locus of the spokes 7 is sandwiched between it and the flanges 30a, 30b of the receiving unit. When the magnetic signal is transmitted, the spokes 7 go by between the transmitting unit 23 and the receiving unit 29 and may be situated on the aforecited magnetic communication channel 201. The lines of magnetic forces for forming the magnetic communication channel become intensive with respect to the magnetic field thereof because of the utilization of the coil 25 including the core 24, thereby forming a closed curve which is expanded wider than the width of each of the spokes 7. Hence, the magnetic communication channel is never completely blockaded by the spokes 7, and the receiving unit 29 is arranged such that the electromotive force is caused by electromagnetic induction.

The functions and the effects inherent in the thus constituted embodiment will hereinafter be described.

When a steering operation is performed by rotating the ring 8, the planetary gears 16, 17 disposed on the sides of the column and the pad respectively revolve while turning round the sun gears 9, 12 disposed on the sides of column and the pad, such revolutions being concomitant with the rotation of the boss plate 6. Inasmuch as the sun gear 9 disposed on the side of column is non-rotatable with respect to the column 1, the sun gear 12 disposed on the side of pad is likewise non-rotatable with respect to the column 1 in conformity to the arrangement of the sun gear 9 disposed on the side of column.

Upon operation of the switch 20 and the like provided on the pad 18, the transmitter 22 generates an electrical signal whose length is so pulse-modulated as to correspond to the type of the electronic appliance; and in the wake of this, the transmitting unit 23 transmits the magnetic signal. The magnetic signal is transferred by way of the magnetic communication channel 201 and performs a function to make the receiving unit 29 cause the electromotive force with the help of electromagnetic induction. The thus-created electromotive force is converted into desired electrical signal at the receiver 32 thereby to actuate multiple appliances.

Figure 2:
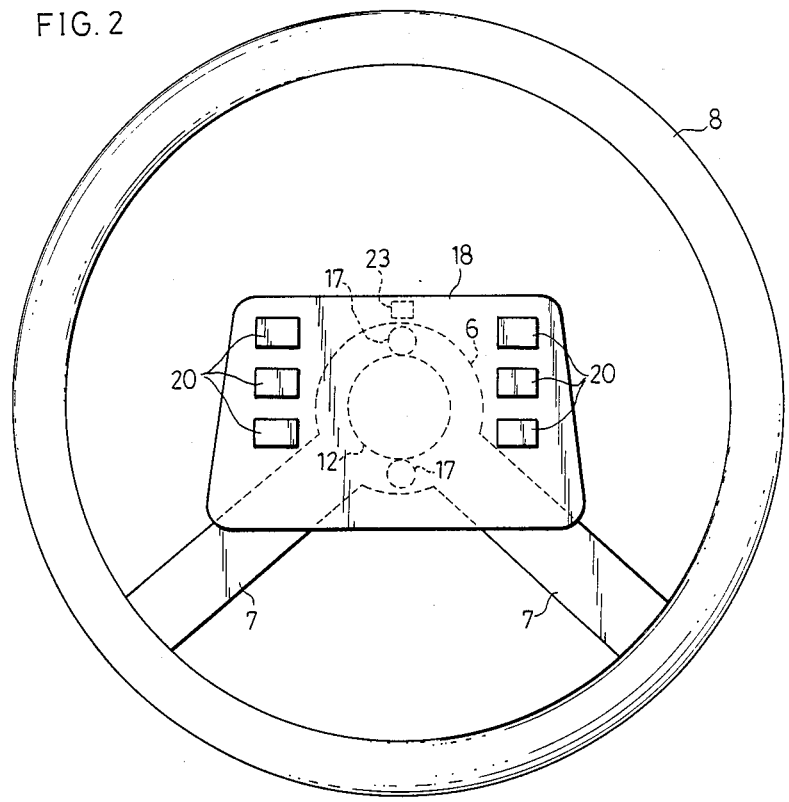
FIG. 2 is an elevation view thereof.

When the spokes 7 are at the positions depicted in FIG. 2, the spokes 7 do not blockade the magnetic communication channel 201. Instead, the magnetic communication is effected between the transmitting unit 23 and the receiving unit 29.

Figure 3:
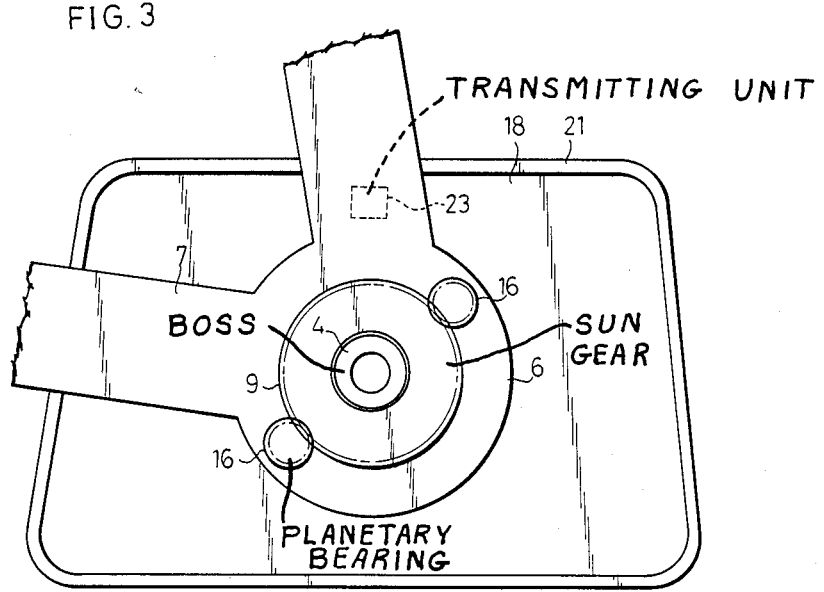
FIG. 3 is a rear elevation view of a principal portion thereof, showing a state in which the spokes slightly rotated from the position shown in FIG. 2.

When the ring 8 and the spokes 7 move from the positions shown in FIG. 2 to slant positions depicted in FIG. 3 while rotating slightly, the spokes 7 reach onto the magnetic communication channel 201. However, the lines of magnetic forces for forming the magnetic communication channel 201 are distributed as shown in FIG. 4.

Namely, the transfer of the magnetic flux at the central portion of the respective cores 24, 30 of the transmitting and receiving units 23, 29 becomes extremely small on account of the inverse magnetic flux caused by an eddy current produced at the spokes 7. The magnetic flux, however, spreads from the flanges 24a, 24b and is then transmitted to the receiving unit 29 such as to go over the spokes 7 with the aid of the inverse magnetic flux caused by the eddy current produced at the spokes 7. At this time, a lot of magnetic fluxes can be taken in through the instrumentality of the flanges 30a, 30b of the receiving unit 29 and hance a complete blockade by the spokes 7 never occurs, whereby the receiving unit 29 is made to cause the electromotive forces with the help of electromagnetic induction.

Figure 5:
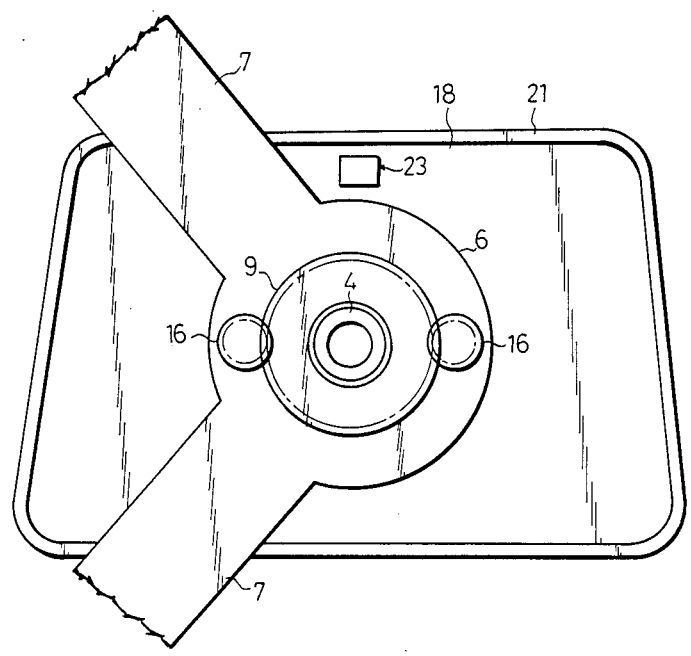
FIG. 5 is a rear elevation view of the principal portion, showing a state wherein the spokes have been rotated from the position shown in FIG. 3.

On the occasion when the ring 8 and the spokes 7 rotate from the positions shown in FIG. 2 and are laterally positioned as shown in FIG. 5, the spokes 7 do not blockade the aforementioned magnetic communication channel 201 at all thereby to effect the magnetic communication once more between the transmitting unit 23 and the receiving unit 29.

With a view to confirming the condition of the magnetic communication of FIG. 2, the following experiment was carried out.

Figure 6:
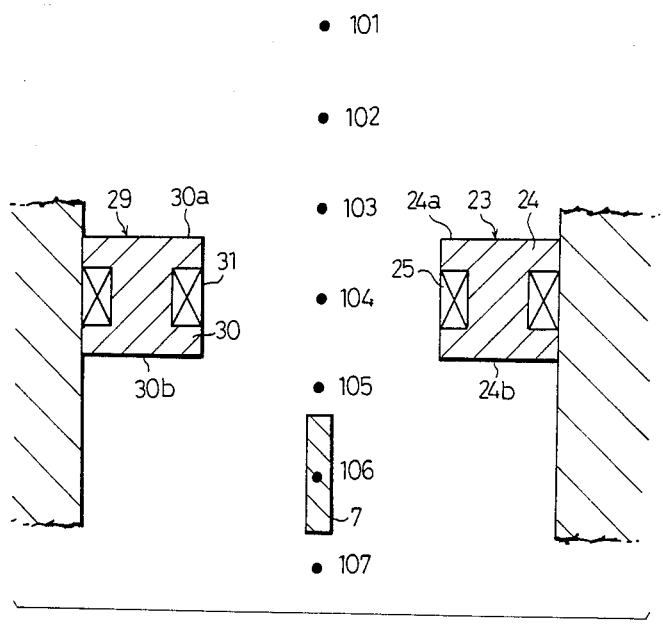
FIG. 6 is a fragmentary sectional view showing an experimental example for confirming the condition of the magnetic communication of this embodiment.
Figure 7:
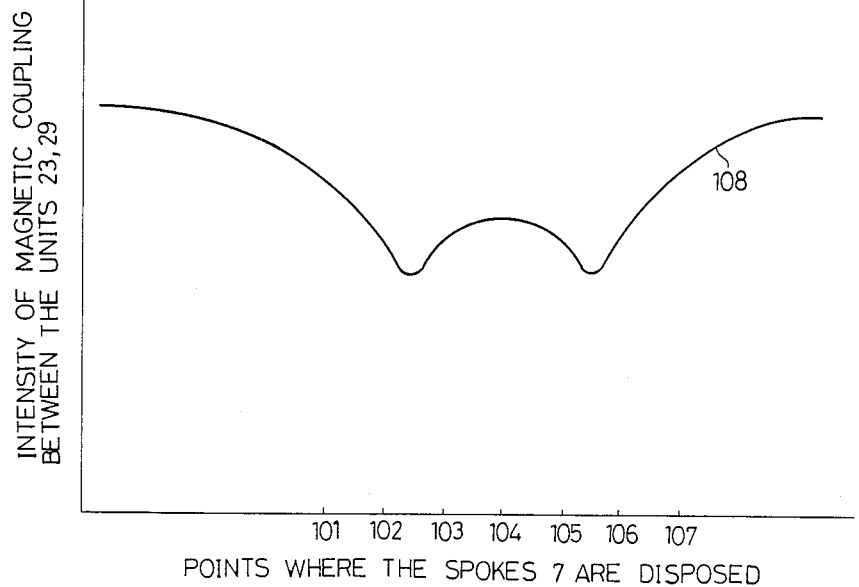
FIG. 7 is a graphical chart showing the experimental results of FIG. 6.

As shown in FIG. 6, a plurality of points 101-107 were provided between the transmitting unit 23 and the receiving unit 29. When the spokes 7 were disposed at the respective points, the intensity of magnetic coupling between the units 23, 29 was measured. Referring to FIG. 7, a solid line indicates the results of measurement.

As can be clarified by observing FIG. 7, the intensity of the magnetic coupling did not sharply decline even when the spokes 7 were disposed on the magnetic line (in the vicinity of the point 102, 105) and it was therefore found out that the magnetic communication does not become incapacitated.

Figure 8:
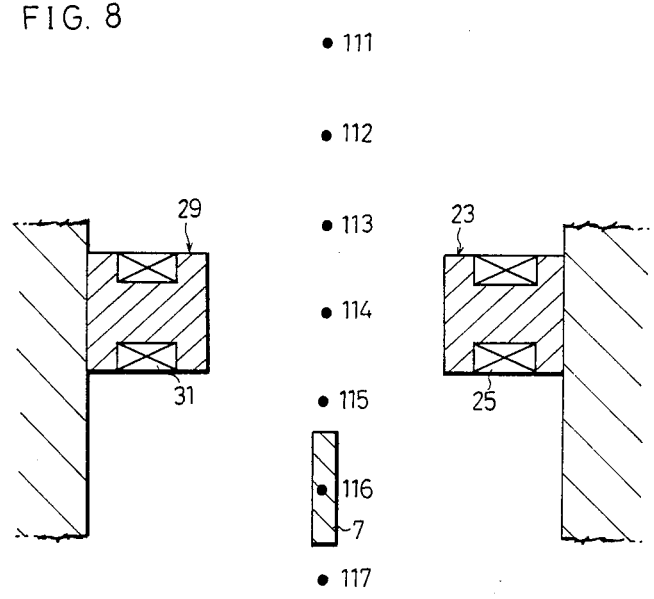
FIGS. 8, 9 are graphical charts of comparative examples of this embodiment, FIG. 8 showing the experimental example, and FIG. 9 showing the results thereof.
Figure 9:
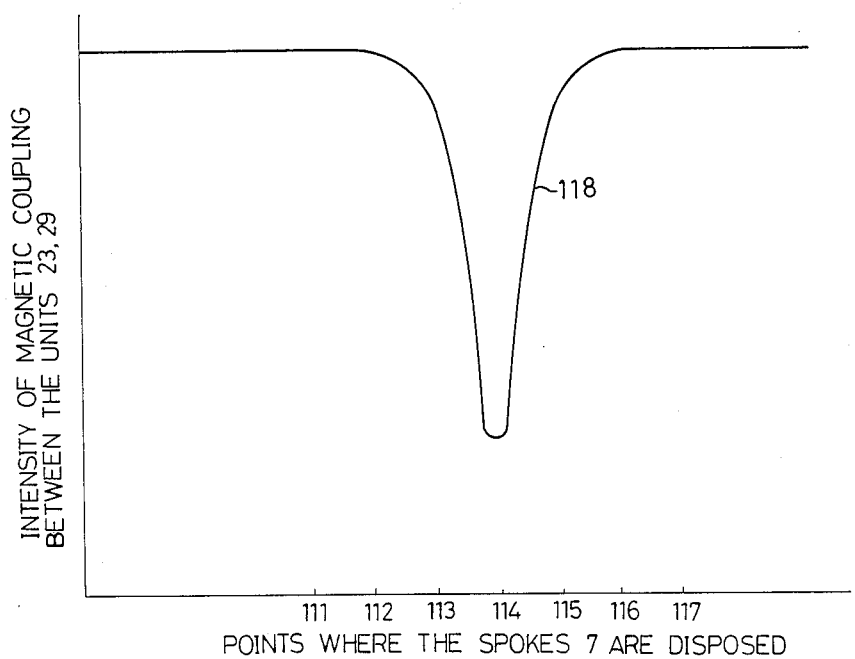

As a comparative exemplification of this experiment, the respective units 23, 29 were, as shown in FIG. 8, disposed so that the directions of axial cores of the coils 25, 31 were aligned on the same straight line. The intensity of the magnetic coupling which was measured under such circumstances is indicated by the solid line 118 of FIG. 9.

In such a case, however, since the magnetic coupling is outstandingly decreased as compared with the situation of FIG. 7 when the spokes 7 are disposed on the lines (in the proximity of the point 114) of the magnetic forces, a receiving level of the aforementioned receiver 32 must be set in a wide range. Hence, this embodiment is more favorable. If the directions of axial cores are aligned on the same straight line, however, this arrangement does not lead to an incapacity of magnetic communication.

According to the thus-constituted embodiment, there is employed magnetic communication as a signal transfer means provided between the pad 18 and the column 1, and the ferrite I-shaped cores 24, 30 are also used with the intention of strengthening the magnetic field. Furthermore, when the spokes 7 are positioned between the transmitting unit 23 and the receiving unit 29, the transmitting and receiving units 23, 29 are disposed so that the directions of axial cores of the coils 25, 31 are in parallel with the widthwise directions of the spokes 7. It is consequently possible to form a magnetic communication channel 201 with a sufficiently large width to bestride the spokes 7. With this arrangement, even if the spokes 7 are positioned on the above-described magnetic communication channel 201 having a large width, this channel 201 is never blockaded completely by the spokes 7.

Inasmuch as the coil 31 inclusive of the core 30 is utilized as the receiving unit 29, the volume of magnetic fluxes to be taken in the coil 31 swells thereby to make the receiving unit 29 cause still greater electromotive forces. As a result of this, it is feasible to securely transmit the signals.

Moreover, the magnetic field is intensified and a good deal of magnetic fluxes can be taken in, whereby it is possible not only to miniaturize the transmitting unit 23 and the receiving unit 29 but also to reduce the amount of consumption of electric power and make the magnetic circuit itself compact.

In addition, each of the flanges 30a, and 30b formed at the both ends of the I-shaped core 30 is rendered large in diameter to enlarge the surface area thereof, which configuration contributes to an increase in volume of the lines of magnetic forces that are to be taken in the coil 31. The sensitivity of the magnetic communication is inevitably enhanced.

There is no necessity for the spokes to have slits formed therein, unlike the case in which light communication is utilized, and similarly a plurality of pairs of communication circuits do not need to be provided. Hence, the steering wheel according to the present invention can be manufactured at relatively low costs.

Figure 10:
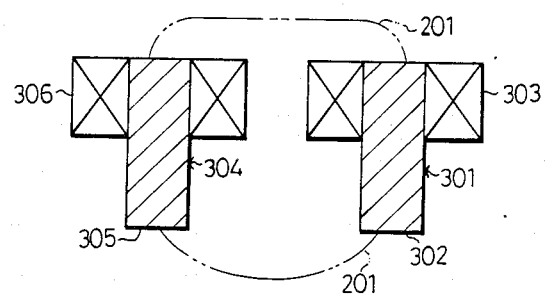
FIGS. 10 to 14 inclusive are partially expanded views each showing another example of the present invention.
Figure 11:
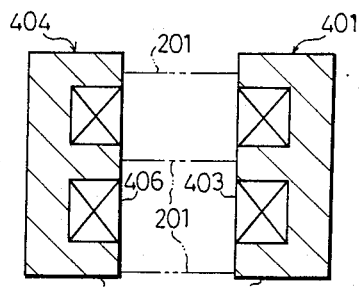
Figure 12:
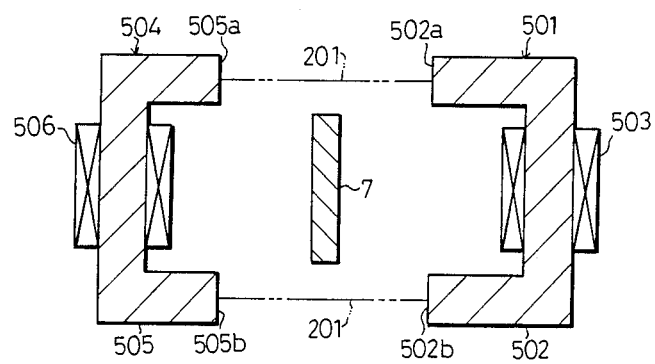
Figure 13:
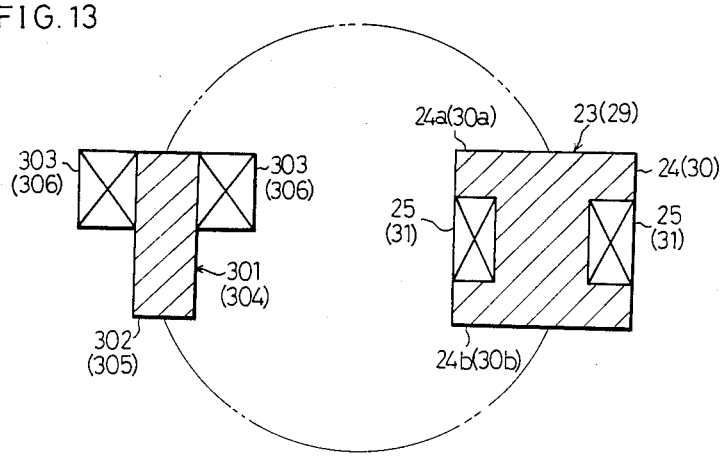

It is to be noted that the present invention is not confined to the above-described embodiment, but can be materialized as follows:

(1) The configuration and the combinations of the cores and the coils which are included in the foregoing transmitting and receiving units are not limited to the aforementioned embodiment, but the following transmitting and receiving units 301, 401, 501, 304, 404, 504 are permissible for use. To be more specific, as shown in FIG. 10, coils 303, 306 may be wound on the longitudinal ends of bar-like cores 302, 305. What is more, as shown in FIG. 11, a pair of protrudent portions are formed by bending the both ends of cores 402, 405 at a right angle to the direction in which they stand in relation to each other, at which intermediate portion a projection extending in the same direction may be provided so as to be wound with coils 403, 406. As shown in FIG. 12, it is permitted that a set of protrudent portions 502a, 502b, 505a, 505b are provided by bending the both ends of bar-like cores 502, 505 at a right angle to the direction in which they are situated opposite to each other; each of distances between the protrudent portions 502a, 502b, 505a, 505b is rendered larger than the width of the spokes 7 in the longitudinal direction of the cores 502, 505; and coils 503, 506 are wound between the protrudent portions 502a, 502b and between 505a, 505b, respectively. What is more, a unit 301, 304 composed of a bar-like core 302, 305 and a coil 303, 306 can be used as one of transmitting and receiving units, while a unit 23, 29 composed of I-shaped core 24, 30 and a coil 25, 31 is used as another of transmitting and receiving units as shown in FIG. 13. The core may take any configuration, if it facilitates the distribution of lines of magnetic forces.

(2) The above-described cores 24, 302, 402, 502, 30, 305, 405, 505 may be composed of magnetic materials such as iron, cobalt, nickel or the like save for ferrite employed in the foregoing embodiment.

(3) Excepting an arrangement wherein the magnetic communication devices are disposed at the upper portion of the rear surface of the pad 18 and at the upper portion of the front end surface of the column 1 outside the outer periphery of the boss plate 6, such devices may be disposed at some portions of the rear surface of the pad 18 and disposed at some portions of the front end surface of the column 1 so that the boss plate 6 is sandwiched therebetween. In other words, any position is allowable for selection unless the magnetic signal 201 is completely hindered from being transmitted.

(4) The present invention can be materialized not only to steering wheel employing two spokes as in the case of the above-described embodiment, but also to other steering wheels which utilize one spoke, three spokes, four spokes or more. In such a case, it is feasible to transmit the signal more securely, if a plurality of pairs of the transmitting units 23, 302, 402, 502 and the receiving units 29, 304, 404, 504 are provided.

(5) The non-rotatable mechanism of the pad is not confined to the planetary gear mechanism described in the aforementioned embodiment. It is practicable to adopt, for instance, a mechanism wherein the column is joined to the pad by means of two connecting members or more (Japanese Patent Publication No. 19471/1983), and a mechanism wherein the column is joined to the pad by the use of helical members (Japanese Patent Publication No. 152781/1983).

(6) The above-described magnetic communication is not confined to a method wherein the signal is, as shown in the foregoing embodiment, transferred from the side on which the pad 18 is disposed to the side of the column 1, but may involve a method wherein the signal is reversely transferred from the side on which the column 1 is disposed to the side of the pad 18.

(7) Each of the above-described magnetic communication units is not confined to a purpose of transmission or reception; and the communication units disposed on the side of the pad and the column are respectively invested with both transmitting and receiving functions so that these communication units may alternately transmit signals from the pad to the column and vice versa at regular intervals.

Figure 14:
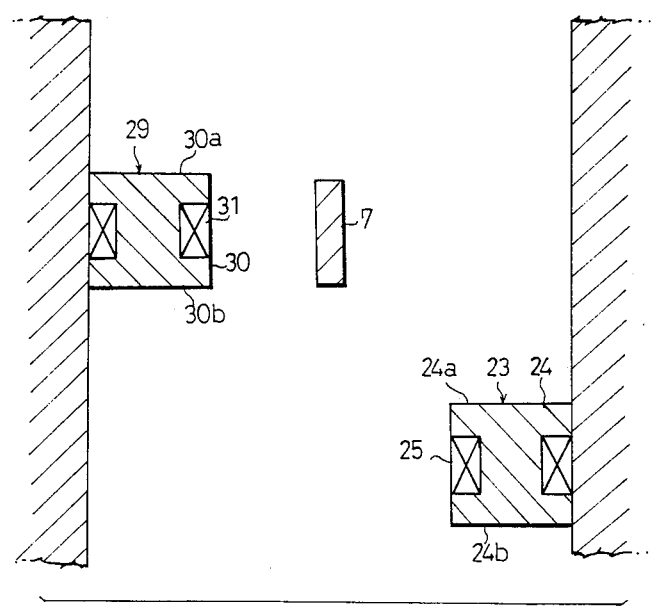

(8) The aforementioned transmitting and receiving units are not necessarily disposed opposite to each other so that the spokes are sandwiched therebetween, and it is, as shown in FIG. 14, feasible to modify the relative positions within a scope where the magnetic communication can be effected.

(9) A coil without a core can be used as at least one of said transmitting and receiving units. Moreover, a Hall element, Hall IC, magnetic reluctance element or the like can be used as a receiving unit.

As can be clarified from the description thus far made, the present invention yields favorable effects wherein coils including cores are employed at least as a receiving unit designed for magnetic communication and hence it is feasible not only to augment the volume of magnetic fluxes that are to be taken in the receiving coils but also to miniatuarize the units themselves and reduce the amount of consumption of electric power, and wherein a magnetic circuit itself can be miniaturized and simplified as well.

As many widely different embodiments of the present invention may be made without departing from the spirit and the scope thereof, it is to be understood that the invention is not limited to the specific embodiments thereof except as defined in the appended claims.

What is claimed is:

1. A communication structure in a steering wheel, comprising: a steering shaft; a boss fixed to said steering shaft; at least one spoke fixed to said boss; a pad installed relatively rotatably to said steering shaft so as to remain non-rotational at a position more proximate to a driver than said boss; a column positioned in relation to said pad so that at least one of said spoke and a boss plate is sandwiched therebetween; and at least one set of magnetic communication units each set of which is composed of a receiving unit and a transmitting unit, each said set having respective units thereof provided on said pad and said column, at least one unit of which consists of a core and a coil wound thereon, said boss and said spoke being interposed between said receiving unit and said transmitting unit.

2. A communication structure in a steering wheel as set forth in claim 1, wherein said communication units of each set are disposed opposite to each other.

3. A communication structure in a steering wheel as set forth in claim 1, wherein: in each set of said communication units the one which consists of a core and a coil is a receiving unit, and the other is a transmitting unit for transmitting a signal based on a magnetic communication to said receiving unit.

4. A communication structure in a steering wheel as set forth in claim 3, wherein: in each said set said transmitting unit is disposed on said pad, and said receiving unit is disposed on said column.

5. A communication structure in a steering wheel as set forth in claim 3, wherein: said communication structure includes:
a plurality of electronic appliances mounted on at least one of said pad and said column; a transmitting device provided on the respective one said pad or said column on which one said transmitting unit is mounted, said transmitting device being connected to said electronic appliances and arranged for transmitting electric signals corresponding to said electronic appliances to said one transmitting unit in order to drive said transmitting unit; and a receiving device provided on the respective other of said pad or said column on which a corresponding one said receiving unit is mounted, said receiving device being connected to said one receiving unit and arranged for reproducing electric signals that are substantially identical with those transmitted from said transmitting device upon receiving signals sent from said one receiving unit.

6. A communication structure in a steering wheel as set forth in claim 3, wherein: in each said set, said core of said receiving unit involves an I-shaped core provided with a pair of flanges each having a large diameter, said flanges being provided at both ends of a cylindrical magnetic member, and wherein said coil of said receiving unit is wound on said I-shaped core between said flanges.

7. A communication structure in a steering wheel as set forth in claim 3, wherein: in each said set, said transmitting unit consists of said core and coil wound thereon.

8. A communication structure in a steering wheel as set forth in claim 7, wherein: in each said set, said core of said transmitting unit comprises an I-shaped core provided with a pair of flanges, each having a large diameter; said flanges being provided at both ends of a cylindrical magnetic member; and, wherein, in each set, said coil of said transmitting unit is wound on said I-shaped core between said flanges.

9. A communication structure in a steering wheel as set forth in claim 7, wherein: in each said set, said core of said receiving unit comprises an I-shaped core provided with a pair of flanges, each having a large diameter; said flanges being provided at both ends of a cylindrical magnetic member; and, wherein, in each said set, said coil of said receiving unit is wound on said I-shaped core between said flanges.

10. A communication structure in a steering wheel as set forth in claim 9, wherein: in each said set, said core of said transmitting unit comprises an I-shaped core provided with a pair of flanges each having a large diameter; said flanges being provided at both ends of a cylindrical magnetic member; and, wherein, in each said set, said coil of said transmitting unit is wound on said I-shaped core between said flanges.

11. A communication structure in a steering wheel as set forth in claim 7, wherein: in each said set, said cores of said transmitting and receiving units are parallel in direction with a tangent to an imaginary circle passing through said transmitting and receiving units and having as its center an axial core of said steering shaft.

12. A communication structure in a steering wheel as set forth in claim 7, wherein: said cores of said transmitting and receiving units are defined as bar-like magnetic members.

13. A communication structure in a steering wheel as set forth in claim 7, wherein: in each said set, said cores of said transmitting and receiving units are arranged such that both ends of bar-like magnetic members are bent at a right angle to the direction on which said both ends are arranged in relation to each other for forming a pair of protrudent portions, wherein a projection is provided between an intermediate portion thereof, said projection extending in the same direction as that of said protrudent portions; and, wherein, in each said set, said coils are wound on said central protrudent portions of said cores.

14. A communication structure in a steering wheel as set forth in claim 7, wherein: in each said set, said cores of said transmitting and receiving units are arranged such that both ends of bar-like magnetic members are bent at a right angle to the direction on which said both ends stand opposite to each other for forming a pair of protrudent portions having a distance between them, said distance being greater than the width of said spokes in the longitudinal direction of said cores; and, wherein, in each said set, said coils are wound on said cores between said protrudent portions.

15. A communication structure in a steering wheel as set forth in claim 7, wherein: in each said set, at least one of said cores of said transmitting and receiving units is composed of a material selected from the group consisting of ferrite, iron, cobalt and nickel.

16. A communication structure in a steering wheel as set forth in claim 7, wherein: in each said set, one of said transmitting and receiving units consists of a bar-like magnetic core having the respective said coil wound thereon; and, wherein, in said set, the other unit consists of an I-shaped core constituted such that a cylindrical magnetic member having two ends is provided at both ends thereof with a pair of flanges each having a large diameter and having the respective said coul wound on said I-shaped core between said flanges.

17. A communication structure in a steering wheel as set forth in claim 1, wherein: each said set of said communication units is arranged to have both transmitting and receiving functions and to alternately effect transmission of signals from said pad to said column and vice versa.

18. A communication structure in a steering wheel as set forth in claim 1, wherein:
in at least one of said sets of magnetic communication units, both units thereof extend less than completely around said steering shaft in the circumferential direction.

* * * * *